United States Patent [19]

Koboyashi et al.

[11] Patent Number: 5,308,525
[45] Date of Patent: May 3, 1994

[54] ELECTROVISCOUS FLUID COMPRISING A BASE NEUTRALIZED CARBOXYARYL GROUP-CONTAINING ORGANOPOLYSILOXANE POLYELECTROLYTE

[75] Inventors: Akihiko Koboyashi; Takashi Nakamura, both of Ichihara, Japan

[73] Assignee: Dow Corning Toray Silicone Co., Ltd., Tokyo, Japan

[21] Appl. No.: 975,039

[22] Filed: Nov. 12, 1992

[30] Foreign Application Priority Data

Nov. 20, 1991 [JP] Japan ................................ 3-331401
Nov. 22, 1991 [JP] Japan ................................ 3-334303

[51] Int. Cl.$^5$ .................. C10M 171/00; C10M 169/04
[52] U.S. Cl. ..................................... 252/78.3; 252/79; 252/572
[58] Field of Search ................ 252/78.3, 76, 79, 572; 556/438, 439, 440

[56] References Cited

U.S. PATENT DOCUMENTS

| | | | |
|---|---|---|---|
| 3,047,507 | 0/1962 | Winslow | 252/75 |
| 4,129,513 | 12/1978 | Stangroom | 252/78.1 |
| 5,210,251 | 5/1993 | Ohashi et al. | 556/437 |

FOREIGN PATENT DOCUMENTS

| | | |
|---|---|---|
| 0291338 | 11/1988 | European Pat. Off. . |
| 0478034 | 4/1992 | European Pat. Off. . |
| 61-44998 | 3/1986 | Japan . |
| 1-80238 | 7/1989 | Japan . |
| 1-262942 | 10/1989 | Japan . |
| 3-39934 | 2/1991 | Japan . |

OTHER PUBLICATIONS

Abstract EP 432601; Bayer AG; Hermann et al., Jun. 19, 1991.

*Primary Examiner*—Christine Skane
*Attorney, Agent, or Firm*—Sharon Severance

[57] ABSTRACT

This invention pertains to electroviscous fluids comprising a dispersion in an electrical insulating fluid of microparticles that are comprised of a polyelectrolyte or a mixture of a polyether and a polyelectrolyte wherein said polyelectrolyte consists of a carboxyaryl group-containing organopolysiloxane that has been neutralized by a base containing a monovalent or divalent metal. The electroviscous fluids of this invention provide a high electroviscous effect and good dispersion stability, and they are thermally stable and do not abrade surrounding equipment.

11 Claims, No Drawings

ELECTROVISCOUS FLUID COMPRISING A BASE NEUTRALIZED CARBOXYARYL GROUP-CONTAINING ORGANOPOLYSILOXANE POLYELECTROLYTE

BACKGROUND OF THE INVENTION

Fluids whose viscosity can be varied by the application of an external voltage can be used, for example, for power transfer, for shock absorption, and as valves, and as a result such fluids have recently been the subject of some scrutiny. Fluids whose viscosity increases in response to an electrical field are collectively known as electroviscous fluids. However, in order to be able to withstand highly practical applications in, for example, clutches, engine mounts, and shock absorbers, an electroviscous fluid is required whose yield value is substantially increased by the application of small voltages.

Various types of such fluids have already been proposed. These have generally taken the form, for example, of dispersions of porous inorganic particles (e.g., silica, alumina, talc, etc.) in electrical insulating fluids. Due to the formation of an electric double layer due in every case to water adsorbed on the particle surface, the particles orient in response to an external electrical field and the viscosity increases (more specifically, the fluid converts into a Bingham fluid and exhibits a yield value). This effect is hereinafter referred to as the Winslow effect. Based on the substantial practical advantages offered by silica (ease of industrial acquisition, rich potential for improvements and modifications in quality, etc.), many electroviscous fluids have been proposed that use silica in the system, for example U.S. Pat. No. 3,047,507 and Japanese Patent Application Laid Open Number Sho 61-44998 [44,998/1986]. However, these particular electroviscous fluids do not perform satisfactorily in industrial applications because they abrade the surrounding equipment, suffer from particle sedimentation, and exhibit a Winslow effect of modest degree.

In order to improve upon these deficiencies, electroviscous fluids have been proposed that comprise the dispersion of a polyelectrolyte in an electrical insulating fluid. The term polyelectrolyte collectively denotes polymeric compounds that contain ion pairs within the structure. Many natural and synthetic polyelectrolytes are known, and the ion-exchange resins are the best known. For example, Japanese Patent Application Laid Open Number Hei 1-180238 [180,238/1989] discloses an electroviscous fluid that comprises the dispersion in an electrical insulating fluid of microparticles of a polyelectrolyte that contains amine salt structures. Japanese Patent Application Laid Open Number Hei 1-262942 [262,942/1989] discloses an electroviscous fluid that comprises the dispersion in an electrical insulating fluid of particles prepared by pulverizing ion-exchange resin. The following advantages are associated with the use of such polyelectrolyte particles: because the particles are made of organic polymer, (a) they have a small specific gravity and thus resist sedimentation and (b) they have little abrasiveness for surrounding equipment; also, (c) they provide a relatively large Winslow effect. Another advantage associated with synthetic polyelectrolytes is that the particle can be freely engineered.

However, the preparation of polyelectrolyte particle-based electroviscous fluids as known in the art involves solidification of the electrolyte through three-dimensional crosslinking by some methodology followed by the preparation of microparticles by, for example, pulverization, etc. In this approach, the three-dimensional configuration of the electrolyte is locked in at the point of synthesis and the electrolyte can then no longer be reworked. Another deficiency in this approach is that the microparticulation process cannot produce perfectly spherical particles, and this in turn precludes both a satisfactory dispersion stability and a satisfactory Winslow effect. In addition, all of the polyelectrolyte particles proposed to date are carbon-based. Silicone oil as described below is the best electrical insulating fluid; however, carbon-based particles have a poor affinity for silicone oil.

Thus, as discussed above, none of the electroviscous fluids proposed to date perform satisfactorily. It is an object of the instant invention an electroviscous fluid that provides a high electroviscosity effect (yield value), has a good dispersion stability, is heat stable even at elevated temperatures of 100° C. and above, and does not abrade or wear the surrounding equipment.

SUMMARY OF THE INVENTION

The present invention relates to an electroviscous fluids, that is, fluids whose viscosity can be varied by varying an externally applied electric voltage. More particularly, the present invention relates to an electroviscous fluids whose yield value is substantially increased by small voltages, which strongly resists particle sedimentation, which is heat stable, and which does not wear or abrade surrounding equipment.

The present invention relates to electroviscous fluids that are comprised of a dispersion in an electrical insulating fluid of microparticles that are comprised of a polyelectrolyte wherein said polyelectrolyte consists of carboxyaryl group-containing organopolysiloxane that has been neutralized by a base containing a monovalent or divalent metal. The present invention further relates to electroviscous fluids that are comprised of a dispersion in an electrical insulating fluid of microparticles that are comprised of a mixture of a polyether and a polyelectrolyte wherein said polyelectrolyte consists of carboxyaryl group-containing organopolysiloxane that has been neutralized by a base containing a monovalent or divalent metal.

THE INVENTION

The particular polyelectrolyte used by the present invention is essential for obtaining a high Winslow effect, stable particle dispersion, and heat resistance while avoiding wear of the surrounding equipment. The polyelectrolytes of the instant invention consist of a carboxyaryl group-containing organopolysiloxane that has been neutralized by a base containing a monovalent or divalent metal. Examples of useful carboxyaryl group-containing organopolysiloxane include but are not limited to:

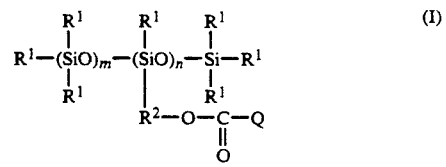

wherein $R^1$ may be selected from an alkyl group, $R^2$ may be selected from an alkylene group, Q may be selected from

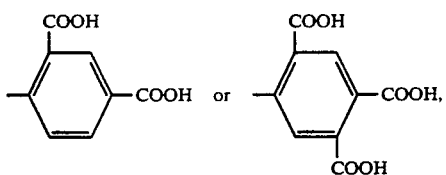

m may be selected from 0 or a positive integer and n is a positive integer; and

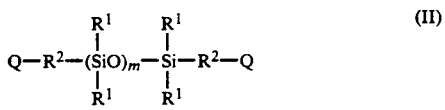

wherein $R^1$ may be selected from an alkyl group, $R^2$ may be selected from an alkylene group, Q may be selected from

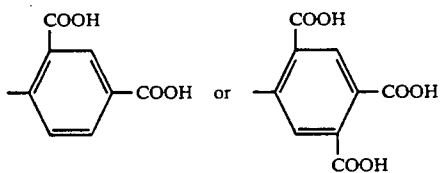

and m may be selected from 0 or a positive integer.

These organopolysiloxanes can be prepared by various synthetic methods. A particularly easy and reliable method consists of the reaction with heating of trimellitic anhydride or pyromellitic anhydride with diorganopolysiloxane bearing pendant or terminal carbinol groups (ring-opening addition of the carbinol group across the anhydride ring).

These organopolysiloxanes can give a large Winslow effect because the carboxyl group density can be increased to high levels. Further, due to the presence of the aromatic ring, these organopolysiloxanes are a highly crystalline solid at room temperature. On the other hand, because they are linear polymers, they are not only meltable (melting point around 175° C.), but they are also soluble in polar solvents such as tetrahydrofuran. As a result, these polymers will exhibit the physical properties of a solid in any process state while at the same time it can also be relatively freely subjected to primary and secondary processing (conversion to the electrolyte).

The polyelectrolytes employed by the present invention are obtained by neutralization of the above-described organopolysiloxane with base that contains monovalent or divalent metal. The base used in this process is not particularly restricted as long as it contains monovalent or divalent metal. However, it is preferable that the base be a hydroxide or hydride. The neutralization reaction is preferably conducted in a polar solvent/water mixed solvent system. It is preferable to carry out the reaction at low temperatures not exceeding approximately 50° C. in order to avoid siloxane bond rearrangement. In addition, a metal ion equivalents/—COOH ratio in excess of 1 should be avoided to the maximum extent possible because the presence of excess base adversely affects the particles and/or the dispersion medium.

No particular restrictions apply to the structure and composition of the polyelectrolyte obtained as described above, but a relatively good Winslow effect is obtained when the following conditions are satisfied.

While the presence of the peralkylsiloxy unit (—COOH—free) is not essential, the particulated electrolyte will exhibit a particularly good affinity for the electrical insulating fluid when this unit is present. However, the contribution by the salt moiety is diminished with an increasing proportion of peralkylsiloxy unit, with the result that the Winslow effect becomes attenuated and the particle production process is made more difficult because the water solubility of the electrolyte is reduced. The ratio between the number of peralkylsiloxy units and the number of —COOH—containing units must therefore fall within an optimal range. The water solubility of the electrolyte increases and the Winslow effect increases as the number of —COOH groups per aromatic ring increases, but again a suitable balance should be maintained with the peralkylsiloxy unit for the reason given above. With regard to the neutralization ratio per —COOH group, larger values for this parameter result in an increased water solubility for the electrolyte and a larger Winslow effect, and larger values for this parameter are therefore preferred. However, when this value exceeds 1, the excess base not only creates the potential for decomposition or alteration of the various materials making up the electroviscous fluid, but also causes performance problems for the electroviscous fluid itself, such as leakage current, dielectric breakdown, and so forth. The neutralization ratio must therefore be held strictly to $\leq 1$.

The polyelectrolyte used in the present invention is in all cases a solid at room temperature. This polyelectrolyte is water soluble when a monovalent metal base is used. The polyelectrolyte of the instant invention can be produced by means of spraying an aqueous solution of the polyelectrolyte into heated air and allowing drying to occur in a sprayed state (spray drying methods). Processing advantages with these methods include the ability to control the shape, size and water content of the particles. When a divalent metal base is used, the water solubility of the polyelectrolyte declines as the proportion of divalent metal base increases, and the polyelectrolyte microparticles become completely insoluble in water when the proportion of divalent metal base reaches 100%. However, aqueous suspensions are formed at concentrations of about 20 weight % for divalent metal base percentages up to approximately 75%.

The instant invention further pertains to electroviscous fluids that consist of a dispersion in an electrical insulating fluid of microparticles that are composed of a mixture of a polyether and a polyelectrolyte wherein said polyelectrolyte consists of carboxyaryl group-containing organopolysiloxane that has been neutralized by a base containing a monovalent or divalent metal.

The structure of the polyether used by the present invention preferably contains the oxyalkylene unit, for example, oxyethylene or oxypropylene. The polyether may be linear or branched. No particular restriction applies to its terminal groups, nor is its molecular weight specifically restricted. However, polyethers terminated by alkyl have significantly lower boiling points than the hydroxyl-terminated polyethers, and molecular weights below 100 are particularly incongruous with the object of the present invention (no losses at high temperatures) and should be avoided due to the associated possibility of migration from the particle interior after formulation into the electroviscous fluid.

On the other hand, even very high molecular weights will be unproblematic as long as the polyether and the above-described electrolyte can be mixed to homogeneity using water or the like in the stage prior to particle production. However, a highly crosslinked polyether is disadvantageous as a medium for the electrolyte due to the associated low ionic dissociation and ion transport activities.

With regard to the function of this polyether, it promotes dissociation of the ion pairs in the polyelectrolyte and thereby supports the development of a large Winslow effect. In addition, unlike low-volatility substances such as water, it does not escape from the system even at high temperatures, and it thereby equips the electroviscous fluid with heat resistance. No particular restriction applies to the method for adsorption to the polyelectrolyte, but an efficient and reliable method consists of dissolution of the polyether and polyelectrolyte in water and spray-drying this solution. Nor do specific restrictions apply to the adsorption quantity, but adsorption quantities on the level of 1 weight % to 30 weight % are preferred. The bases for this range are as follows: no promotion of the Winslow effect is noted at below 1%, while polyether escapes at more than 30% and causes leakage current.

Many methods are available for preparation of the microparticles (mixture of polyelectrolyte and polyether) used by the present invention. In one method, the above-described polyelectrolyte and polyether are dissolved in water, this aqueous solution is sprayed into a hot gas, and microparticles are formed by drying while in the sprayed state. This method, known as spray-drying, is a general method for converting polymeric compounds into microparticles.

The electroviscous fluid in accordance with the present invention comprises a dispersion in electrical insulating fluid of microparticles of the polyelectrolyte or polyelectrolyte/polyether mixture. No specific restrictions apply to the type of electrical insulating fluid as long as it is a liquid at room temperature and is electrically insulating. The electrical insulating fluid is exemplified by mineral oils, dibutyl sebacate, chloroparaffins, fluorine oils, silicone oils, and so forth.

Among the preceding examples of electrical insulating fluids, silicone oils are preferred for their high electrical insulation, low temperature-dependent viscosity variation, and so forth. The silicone oil is preferably a diorganopolysiloxane oil with a chemical structure with the specific formula given below.

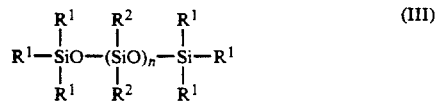

In the preceeding formula (IV), $R^1$ and $R^2$ represent monovalent hydrocarbon groups, for example, alkyl groups such methyl, ethyl, propyl and others; aryl groups such as phenyl, naphthyl, and others; and substituted hydrocarbon groups comprising the preceding partially substituted by fluorine, chlorine, amino, nitro, epoxy, and others. Among these groups, methyl preferably comprises at least 30 mole % of $R^1$ and $R^2$ from the standpoints of economics and material acquisition. The degree of polymerization n is not specifically restricted, but n preferably does not exceed 1,000 and more preferably does not exceed 100 in order for the viscosity to fall within practical ranges. Diorganopolysiloxane oils with such chemical structures are known as "silicone oils" and are available as various commercial products, for example, SH200 from Dow Corning Toray Silicone Company, Limited.

Among the diorganopolysiloxane oils as described above, diorganopolysiloxanes in which some of $R^1$ and $R^2$ are fluoroalkyl groups are preferred for their ability to bring about higher Winslow effects and prevent particle sedimentation due to specific gravity differences. The chemical structure of this fluoroalkyl group is not specifically restricted, but fluoroalkyl groups having no more than 10 carbons are preferred based on ease of synthesis, and gamma,gamma,gamma-trifluoropropyl is particularly preferred. In order to obtain a substantial promotion of the Winslow effect, the fluoroalkyl content is preferably at least 30 mole %.

The mechanism by which the fluoroalkyl group enhances the Winslow effect is unclear. However, the following can be hypothesized: a strong intramolecular dipole is generated because both electronegative fluorine and electropositive silicon are present within the molecule separated by a suitable distance, and contact between this dipole and the dispersed particle promotes the particle's internal polarization. In addition, since a fluorine-containing fluid tends to have an increased specific gravity, such a liquid simultaneously functions to inhibit particle sedimentation.

Such fluoroalkyl-containing diorganopolysiloxanes are available as various commercial products, for example, FS1265 from Dow Corning Toray Silicone Company, Limited.

The electroviscous fluid in accordance with the present invention comprises the dispersion of polyelectrolyte or polyelectrolyte/polyether particles in an electrical insulating fluid. The amount of polyelectrolyte or polyelectrolyte/polyether particles dispersed preferably falls within the range of 0.1 to 50 weight % and more preferably within the range of 10 to 40 weight %. A satisfactory viscosity increase activity is not obtained at below 0.1 weight %. On the other hand, at values in excess of 50 weight %, the viscosity of the system is increased to such a substantial degree that practical applications are precluded.

So that those skilled in the art can understand and appreciate the invention taught herein, the following examples are presented, being it understood that these examples should not be used to limit the scope of this invention found in the claims attached hereto. The viscosity is the value measured at 25° C.

The electroviscosity was measured as follows. The test fluid was placed in an aluminum cup (inside diameter = 42 mm), and an aluminum rotor (diameter = 40 mm, length = 60 mm) was then inserted into the cup. With this cylindrical cell set upright, the cup was linearly accelerated over 40 seconds from a shear rate (D) of zero to 330 s$^{-1}$. During this period, the torque applied to the rotor was detected by a torque sensor and was converted into shear stress (S), and a D-versus-S curve was drawn on an XY recorder. The rotor was then electrically grounded, a directcurrent voltage was applied to the cup, and another D-versus-S curve was constructed in the same manner as before. The linear segment was extrapolated to the S axis, and this was designated as the yield value at the particular field strength.

EXAMPLE 1

Trimellitic anhydride and polydimethyl siloxane wherein some of the side-chain methyl groups had been substituted with hydroxypropyl groups were introduced such that the number of moles of the hydroxy groups and anhydride rings were equal. Reaction was allowed to occur for 30 min at 160° C. while agitating in a melted state. Polymer (V) having the following structure was obtained.

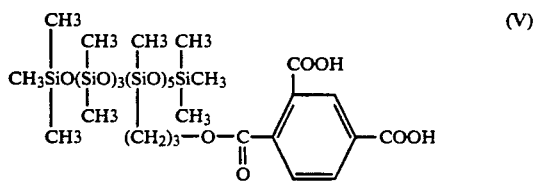
(V)

Polymer (V) was a solid with a melting point at approximately 175° C. and was soluble in polar solvents such as tetrahydrofuran and acetone.

100 g Polymer (V) were dissolved in approximately 1.2 L tetrahydrofuran (THF). Meanwhile, lithium hydroxide in an equivalent amount with the —COOH groups present in Polymer (V) was dissolved in a solvent mixture of 350 mL tetrahydrofuran and 520 mL water. The lithium hydroxide solution was added dropwise to the Polymer (V) solution while agitating at room temperature. The solvent was then removed from the reaction solution at 50° C. or less to obtain a white solid. This white solid was water-soluble but insoluble in organic solvents. In addition, the melting point of the solid was at least 100° C. greater than that of Polymer (V). It was confirmed by infrared absorption spectroscopy that a salt structure was formed (—COO—Li+), and specifically, that the desired polyelectrolyte had been obtained.

Next, this polyelectrolyte was used to produce a 30 wt % aqueous solution and spray-drying was carried out under the conditions described below to produce a particulate.
Spraying format: atomizer
Air pressure: 1.5 kg/cm$^2$
Temperature at spray location: approximately 200° C.
Temperature at collection location: approximately 100° C.

Approximately 15 g of a powder were obtained as a result of feeding 100 g polyelectrolyte aqueous solution over approximately 10 min. This powder was observed under a microscope and found to be a spherical particulate with an average particle diameter of approximately 10 μm (water content 5%).

Immediately after spray-drying, this powder was uniformly dispersed in a 20 CS dimethylpolysiloxane oil at a concentration of 33 wt %. This dispersion was used as the electroviscous liquid. The electroviscous liquid was allowed to stand at room temperature for 4–5 days before sedimentation of the solid content began and the dispersion stability was deemed good.

The electroviscous characteristics of this electroviscous liquid were measured and a yield value of 150 Pa was obtained at 1 kV/mm and 225 Pa was obtained at 2 kV/mm. Moreover, the leakage current at an electric field strength of 1 kV/mm was an extremely low 10 nA/cm2. In addition, with the cup filled with the electroviscous liquid, continuous rotation was carried out for 24 h at a constant shear rate of 300 s$^{-1}$, but no traces of abrasion could be determined upon visual examination of the aluminum rotor and cup after removing the liquid.

EXAMPLE 2

Immediately after spray-drying, the polyelectrolyte powder obtained in Example 1 was uniformly dispersed, physically, in a methyl(gamma,gamma,gamma-trifluoropropyl) polysiloxane oil (300 CS) at a concentration of 33 wt %. This dispersion was used as the electroviscous liquid. The electroviscous liquid required approximately 1 month of standing at room temperature before sedimentation of the solid content began, and the dispersion stability was deemed excellent.

The electroviscous characteristics of this electroviscous liquid were measured and a yield value of 320 Pa was obtained at 1 kV/mm and 550 Pa was obtained at 2 kV/mm. Moreover, the leakage current at an electric field strength of 1 kV/mm was an extremely low 20 nA/cm$^2$. In addition, with cup filled with the electroviscous liquid, continuous rotation was carried out for 24 h at a constant shear rate of 300 s$^{-1}$, but no traces of abrasion could be determined upon visual examination of the aluminum rotor and cup after removing the liquid.

EXAMPLE 3

100 g of Polymer (V) described above were dissolved in approximately 1.2 L tetrahydrofuran (THF). Meanwhile, a mixture of lithium hydroxide and calcium hydroxide in equivalent amounts of ½ that of the —COOH groups present in Polymer (V) was dissolved in a solvent mixture of 350 mL tetrahydrofuran and 520 mL water. The lithium hydroxide calcium hydroxide solution was added dropwise to the Polymer (V) solution while agitating at room temperature. The solvent was then removed from the reaction solution at 50° C. or less to obtain a white solid. This white solid was water-soluble but insoluble in organic solvents. In addition, the melting point of the solid was at least 100° C. greater than that of Polymer (V). It was confirmed by infrared absorption spectroscopy that a salt structure was formed (—COO$^-$Li$^+$ or (—COO$^-$)$_2$Ca$^{2+}$), and specifically, that the desired polyelectrolyte had been obtained.

Next, this polyelectrolyte was used to produce a 30 wt % aqueous solution and spray-drying was carried out under the same conditions as in Application Example 1.

Approximately 20 g of a powder were obtained as a result of feeding 100 g of the polyelectrolyte aqueous solution over approximately 10 min. This powder was observed under a microscope and found to be a nearly perfectly spherical particulate with an average particle diameter of approximately 10 μm.

Immediately after spray-drying, this powder was uniformly dispersed, physically, in a dimethylpolysiloxane oil (20 CS) at a concentration of 33 wt %. This dispersion was used as the electroviscous liquid. The electroviscous liquid required 4–5 days of standing at room temperature before sedimentation of the solid content began and the dispersion stability was deemed good.

The electroviscous characteristics of this electroviscous liquid were measured and a yield value of 150 Pa was obtained at 1 kV/mm and 210 Pa was obtained at 2 kV/mm. Moreover, the leakage current at an electric field strength of 1 kV/mm was an extremely low 2 nA/cm². In addition, with the cup filled with electroviscous liquid, continuous rotation was carried out for 24 h at a constant shear rate of 300 s⁻¹ but no traces of abrasion could be determined upon visual examination of the aluminum rotor and cup after removing the liquid.

EXAMPLE 4

Trimellitic anhydride was combined with polydimethylsiloxane in which a portion of the pendant methyl had been replaced by hydroxypropyl (number of moles of hydroxyl groups = number of moles of anhydride ring), and a reaction was run for 30 minutes while stirring their melt at 160° C. to afford polymer (VI) with the structure given below.

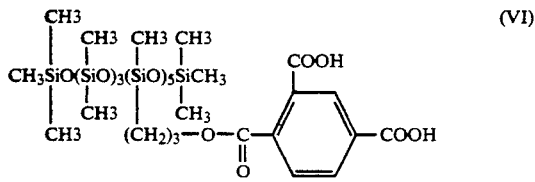

Polymer (VI) was a solid with a melting point of approximately 175° C., and it was soluble in polar solvents such as tetrahydrofuran, acetone, etc.

One hundred grams of polymer (VI) was dissolved in approximately 1.2 L tetrahydrofuran (THF). A quantity of lithium hydroxide equivalent to the —COOH groups in the polymer (VI) was dissolved in a mixed solvent comprised of 350 mL tetrahydrofuran and 520 mL water. The lithium hydroxide solution was then dripped into the polymer (VI) solution while stirring at room temperature. Removal of the solvent from the reaction solution at 50° C. afforded a white solid. This white solid was soluble in water and insoluble in organic solvents, and its melting point was at least 100° C. higher than that of polymer (VI). Infrared absorption spectral analysis confirmed the formation of the —COO⁻Li⁺ salt structure and thus the formation of the desired polyelectrolyte.

A 30 weight % aqueous solution was prepared from this polyelectrolyte, to which was added 25 weight % (based on the polyelectrolyte) hydroxy-terminated polyethylene glycol with average molecular weight = 400 (Polyethylene Glycol 400 from Wako Junyaku Kogyo Kabushiki Kaisha). Particles were then prepared by spray-drying under the following conditions.

spray method: atomizer mode
air pressure: 1.5 kg/cm²
temperature at spray position: approximately 200° C.
temperature at collection position: approximately 100° C.

Feeding 100 g of the aqueous polyelectrolyte solution over approximately 10 minutes resulted in the production of approximately 15 g powder. Microscopic observation of this powder confirmed it to be a spherical micropowder with an average particle diameter of approximately 10 micrometers (water content = 5%).

After spray-drying, this powder was dried for 4 hours at 140° C. under a nitrogen current. The weight loss during this period was approximately 5%. Immediately after drying, this powder was homogeneously dispersed at a concentration of 33 weight % in dimethylpolysiloxane oil (20CS) to afford a dispersion designated as the electroviscous fluid. When this electroviscous fluid was allowed to stand at room temperature, 4 to 5 days were required for the solids to begin to sediment, which confirmed the dispersion stability to be relatively good.

The electroviscosity of this electroviscous fluid was measured with the following results: yield value = 150 Pa at a 1 kV/mm field strength and yield value = 230 Pa at a 2 kV/mm field strength. The leakage current was extremely low, being approximately 10 nA/cm² at a 1 kV/mm field strength. In addition, the cup filled with this electroviscous fluid was subjected to continuous rotation at a constant shear rate of 300 s⁻¹ for 24 hours, and the fluid was then drained off. In terms of appearance, no trace of abrasion was observed on either item when the aluminum rotor and cup were inspected visually.

EXAMPLE 5

The electroviscous fluid prepared in Example 4 was heat aged by immersion for 24 hours open to the atmosphere in an oil bath at 100° C. The appearance of the fluid was unchanged by this ageing. 4 to 5 days were again required for the solids to begin to sediment when this aged electroviscous fluid was held at room temperature, which confirmed that the fluid had retained its good dispersion stability.

The electroviscosity of this electroviscous fluid was measured with the following results: yield value = 150 Pa at a 1 kV/mm field strength and yield value = 230 Pa at a 2 kV/mm field strength. The leakage current was extremely low, being approximately 20 nA/cm² at a 1 kV/mm field strength. In addition, the cup filled with this electroviscous fluid was subjected to continuous rotation at a constant shear rate of 300 s⁻¹ for 24 hours, and the fluid was then drained off. In terms of appearance, no trace of abrasion was observed on either item when the aluminum rotor and cup were inspected.

EXAMPLE 6

One hundred grams of the above-described polymer (VI) was dissolved in approximately 1.2 L tetrahydrofuran (THF), while lithium hydroxide (½ equivalents based on the —COOH groups in polymer (VI)) and calcium hydroxide (½ equivalents based on the —COOH groups in polymer (VI)) were dissolved in a mixed solvent of 350 mL tetrahydrofuran and 520 mL water. This lithium hydroxide/calcium hydroxide solution was then dripped into the polymer (VI) solution while stirring at room temperature. Removal of the solvent from the reaction solution at 50° C. afforded a white solid. This white solid was soluble in water and insoluble in organic solvents, and its melting point was at least 100° C. higher than that of polymer (VI). Infrared absorption spectral analysis confirmed the formation of —COO⁻Li⁺ and (—COO⁻)₂Ca²⁺ salt structures and thus the formation of the desired polyelectrolyte.

A 30 weight % aqueous solution was prepared from this polyelectrolyte, to which was added 25 weight % (based on the polyelectrolyte) hydroxy-terminated polyethylene glycol with average molecular weight = 400 (Polyethylene Glycol 400 from Wako Junyaku Kogyo Kabushiki Kaisha). Spray-drying was then conducted under the same conditions as reported in Example 4.

Feeding 100 g of the aqueous solution over approximately 10 minutes resulted in the production of approximately 20 g powder. Microscopic observation of this powder confirmed it to be an almost perfectly spherical powder with an average particle diameter of approximately 10 micrometers.

After spray-drying, this powder was dried for 4 hours at 140° C. under a nitrogen current. The weight loss during this period was approximately 4%. Immediately after drying, this powder was physically dispersed to homogeneity at a concentration of 33 weight % in dimethylpolysiloxane oil (20 CS) to afford a dispersion designated as the electroviscous fluid. When this electroviscous fluid was allowed to stand at room temperature, 4 to 5 days were required for the solids to begin to sediment, which confirmed the dispersion stability to be relatively good.

The electroviscosity of this electroviscous fluid was measured with the following results: yield value=150 Pa at a 1 kV/mm field strength and yield value=205 Pa at a 2 kV/mm field strength. The leakage current was extremely low, being approximately 5 nA/cm$^2$ at a 1 kV/mm field strength. In addition, the cup filled with this electroviscous fluid was subjected to continuous rotation at a constant shear rate of 300 s$^{-1}$ for 24 hours, and the fluid was then drained off. In terms of appearance, no trace of abrasion was observed on either item when the aluminum rotor and cup were inspected.

EXAMPLE 7

The electroviscous fluid prepared in Example 6 was heat aged by immersion for 24 hours open to the atmosphere in an oil bath at 100° C. The appearance of the fluid was unchanged by this ageing. 4 to 5 days were again required for the solids to begin to sediment when this aged electroviscous fluid was held at room temperature, which confirmed that the fluid had retained its good dispersion stability.

The electroviscosity of this electroviscous fluid was measured with the following results: yield value=150 Pa at a 1 kV/mm field strength and yield value=200 Pa at a 2 kV/mm field strength. The leakage current was extremely low, being approximately 20 nA/cm$^2$ at a 1 kV/mm field strength. In addition, the cup filled with this electroviscous fluid was subjected to continuous rotation at a constant shear rate of 300 s$^{-1}$ for 24 hours, and the fluid was then drained off. In terms of appearance, no trace of abrasion was observed on either item when the aluminum rotor and cup were inspected.

COMPARISON EXAMPLE 1

A wet-method silica (Nipsil VN3 from Nippon Silica Kogyo Kabushiki Kaisha) with an average particle size of 18 micrometers was physically dispersed to homogeneity at a concentration of 15 weight % in dimethylpolysiloxane oil (20 CS) to afford a dispersion designated as the electroviscous fluid. When this electroviscous fluid was allowed to stand at room temperature, only several hours were required for the solids to begin to sediment. The dispersion stability was therefore rated as poor.

The electroviscosity of this electroviscous fluid was measured with the following results: yield value=65 Pa at a 1 kV/mm field strength and yield value=105 Pa at a 2 kV/mm field strength. The leakage current was approximately 85 nA/cm$^2$ at a 1 kV/mm field strength. In addition, the cup filled with this electroviscous fluid was subjected to continuous rotation at a constant shear rate of 300 s$^{-1}$ for 24 hours, and the fluid was then drained off. When the aluminum rotor and cup were examined, several wear streaks were observed extending along the direction of rotation.

COMPARISON EXAMPLE 2

The electroviscous fluid prepared in Comparison Example 1 was heat aged by immersion for 24 hours open to the atmosphere in an oil bath at 100° C. The appearance of the fluid was unchanged by this ageing. The dispersion stability at room temperature of the aged electroviscous fluid was approximately the same as that before ageing.

The electroviscosity of this electroviscous fluid was measured with the following results: yield value=5 Pa at a 1 kV/mm field strength and yield value=10 Pa at a 2 kV/mm field strength. The leakage current was extremely low, being approximately 20 nA/cm$^2$ at a 1 kV/mm field strength. In addition, the cup filled with this electroviscous fluid was subjected to continuous rotation at a constant shear rate of 300 s$^{-1}$ for 24 hours, and the fluid was then drained off. When the aluminum rotor and cup were examined, several wear streaks were observed extending along the direction of rotation.

COMPARISON EXAMPLE 3

A weakly acidic spherical acrylic cation-exchange resin (Amberlite IRC-76 from Organo Kabushiki Kaisha) was physically dispersed to homogeneity at a concentration of 10 weight % in dimethylpolysiloxane oil (20 CS) to afford a dispersion that was designated as the electroviscous fluid. When this electroviscous fluid was allowed to stand at room temperature, only several hours were required for the solids to begin to sediment. The dispersion stability was therefore rated as poor.

The electroviscosity of this electroviscous fluid was measured with the following results: yield value=3 Pa at a 1 kV/mm field strength and yield value=12 Pa at a 2 kV/mm field strength. The leakage current was approximately 2 nA/cm$^2$ at a 1 kV/mm field strength. In addition, the cup filled with this electroviscous fluid was subjected to continuous rotation at a constant shear rate of 300 s$^{-1}$ for 24 hours, and the fluid was then drained off. In terms of appearance, no trace of abrasion was observed on either item when the aluminum rotor and cup were inspected.

COMPARISON EXAMPLE 4

The electroviscous fluid prepared in Comparison Example 3 was heat aged by immersion for 24 hours open to the atmosphere in an oil bath at 100° C. The appearance of the fluid was unchanged by this ageing. The dispersion stability at room temperature of the aged electroviscous fluid was approximately the same as that before ageing.

The electroviscosity of this electroviscous fluid was measured, but the yield values at field strengths of 1 kV/mm and 2 kV/mm were below the detection limit. The leakage current was extremely low, being approximately 1 nA/cm$^2$ at a 1 kV/mm field strength. In addition, the cup filled with this electroviscous fluid was subjected to continuous rotation at a constant shear rate of 300 s$^{-1}$ for 24 hours, and the fluid was then drained off. In terms of appearance, no trace of abrasion was observed on either item when the aluminum rotor and cup were inspected.

The results of the electroviscosity testing in the preceding examples and comparison examples are reported in Table 1.

TABLE I

|  |  | Yield Value | | Dispersion | |
| --- | --- | --- | --- | --- | --- |
|  |  | 1kV/mm | 2kV/mm | Stability | Abrasion |
| Examples | 1 | 150 | 225 | good | none |
|  | 2 | 320 | 550 | excellent | none |
|  | 3 | 150 | 210 | good | none |
|  | 4 | 150 | 230 | good | none |
|  | 5 | 150 | 230 | good | none |
|  | 6 | 150 | 205 | good | none |
|  | 7 | 150 | 200 | good | none |
| Comparative | 1 | 65 | 105 | poor | yes |
| Examples | 2 | 5 | 10 | poor | yes |
|  | 3 | 3 | 12 | poor | no |
|  | 4 | below detection limit | | poor | no |

Because the electroviscous fluids of this invention comprise a dispersion in an electrical insulating fluid of a particular polyelectrolyte, it is characterized by a high electroviscous effect (yield value), excellent dispersion stability, thermal stability, and lack of abrasion of surrounding equipment.

What is claimed is:

1. An electroviscous fluid comprising a 0.1 to 50 weight percent dispersion in an electrical insulating fluid of microparticles that are comprised of a polyelectrolyte wherein said polyelectrolyte is comprised of a carboxyaryl group-containing organopolysiloxane that has been neutralized by a base containing a monovalent or a divalent metal wherein the carboxyaryl group-containing organopolysiloxanes are selected from the group consisting of organopolysiloxanes having the formulae:

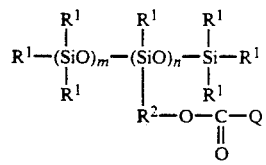

and

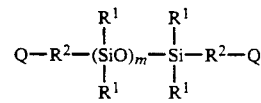

wherein $R^1$ is an alkyl group, $R^2$ is an alkylene group, O is selected from the group consisting of

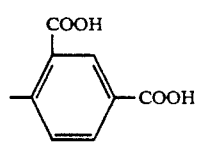

and

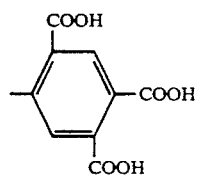

m is 0 or a positive integer and n is a positive integer.

2. The electroviscous fluid as claimed in claim 1, wherein the electrically insulating liquid is a diorganopolysiloxane oil.

3. The electroviscous fluid as claimed in claim 1, wherein the carboxyaryl group-containing organopolysiloxane is

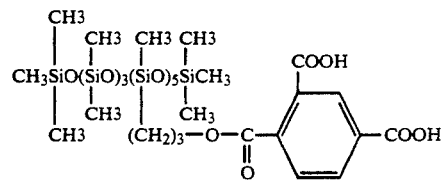

4. The electroviscous fluid as claimed in claim 1, wherein the base is lithium hydroxide.

5. The electroviscous fluid as claimed in claim 1, wherein the base is a mixture of lithium hydroxide and calcium hydroxide.

6. An electroviscous fluid comprising a 0.1 to 50 weight percent dispersion in an electrical insulating fluid of microparticles that are comprised of a mixture of a polyether and a polyelectrolyte wherein said polyelectrolyte is comprised of a carboxyaryl group-containing organopolysiloxane that has been neutralized by a base containing a monovalent or a divalent metal wherein the carboxyaryl group-containing organopolysiloxanes are selected from the group consisting of organopolysiloxanes having the formulae:

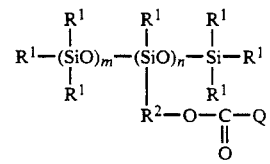

and

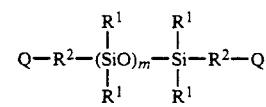

wherein $R^1$ is an alkyl group, $R^2$ is an alkylene group, Q is selected from the group consisting of

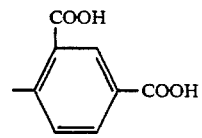

and

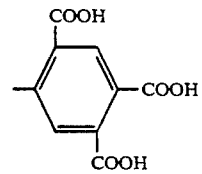

m is 0 or a positive integer and n is a positive integer.

7. The electroviscous fluid as claimed in claim 6, wherein the electrically insulating liquid is a diorganopolysiloxane oil.

8. The electroviscous fluid as claimed in claim 7, wherein the carboxyaryl group-containing organopolysiloxane is selected from organopolysiloxanes having the formula

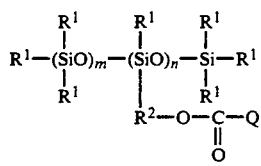

wherein $R^1$ is an alkyl group, $R^2$ is an alkylene group, Q is selected from the group consisting of

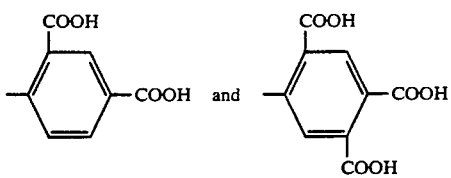

m is 0 or a positive integer and n is a positive integer.

9. The electroviscous fluid as claimed in claim 8, wherein the carboxyaryl group-containing organopolysiloxane is

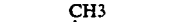

10. The electroviscous fluid as claimed in claim 6, wherein the base is lithium hydroxide.

11. The electroviscous fluid as claimed in claim 6, wherein the base is a mixture of lithium hydroxide and calcium hydroxide.

* * * * *